United States Patent [19]
Fisher

[11] 3,901,324
[45] Aug. 26, 1975

[54] METHOD AND APPARATUS FOR REPLACING DAMAGED TURF

[75] Inventor: Floyd L. Fisher, Lake Oswego, Oreg.

[73] Assignee: Hy-Play Corporation, Portland, Oreg.

[22] Filed: Jan. 30, 1974

[21] Appl. No.: 437,909

[52] U.S. Cl. .................. 172/19; 172/635; 294/107
[51] Int. Cl.² ....................................... A01B 45/04
[58] Field of Search .......... 172/19, 20, 1, 615, 622, 172/635; 47/1.7; 294/107, 88

[56] References Cited
UNITED STATES PATENTS

| | | | |
|---|---|---|---|
| 1,230,320 | 6/1917 | Payne | 172/19 |
| 2,286,619 | 6/1942 | Hokanson | 172/635 X |
| 2,832,634 | 4/1958 | Bergerson | 294/107 X |
| 2,962,177 | 11/1960 | Pridgeon | 294/107 X |
| 3,112,136 | 11/1963 | Hammond | 294/107 |

*Primary Examiner*—Stephen C. Pellegrino
*Attorney, Agent, or Firm*—Klarquist, Sparkman, Campbell, Leigh, Hall & Whinston

[57] ABSTRACT

Large turf sections are moved by frame equipped with tines to penetrate and engage turf. Lifting of frame causes turf section to be lifted with root system intact for removal to new location, such as to damaged portion of athletic playing field.

4 Claims, 7 Drawing Figures

PATENTED AUG 26 1975  3,901,324

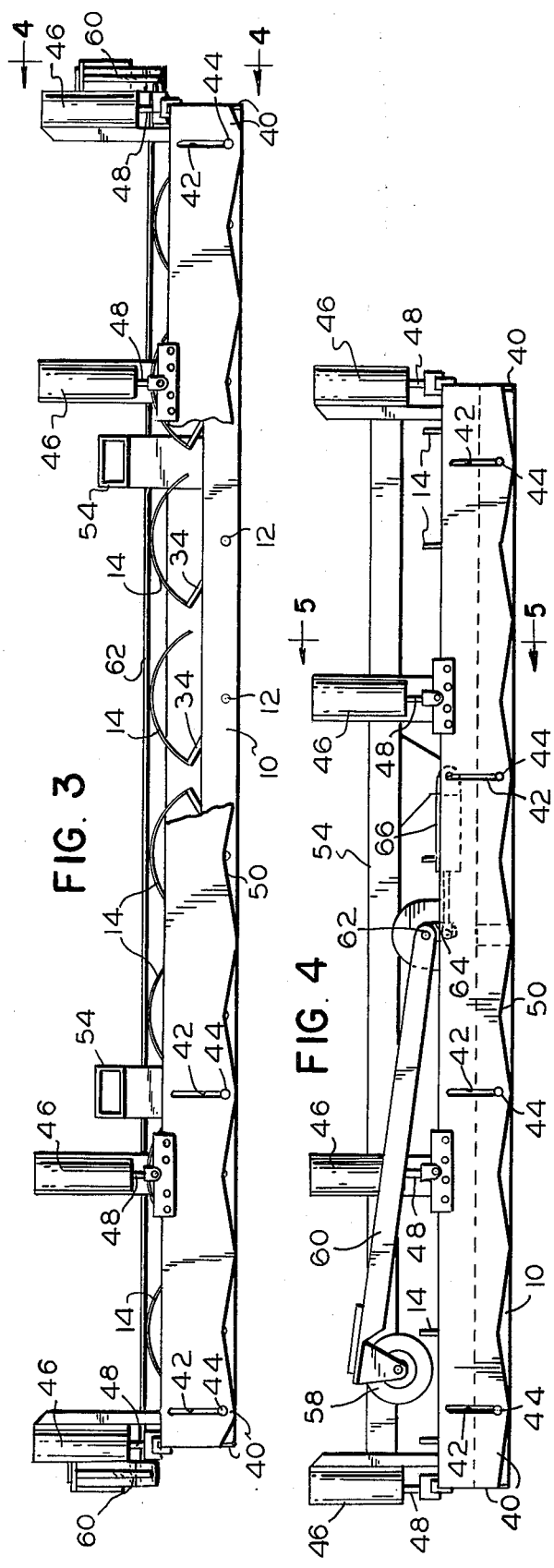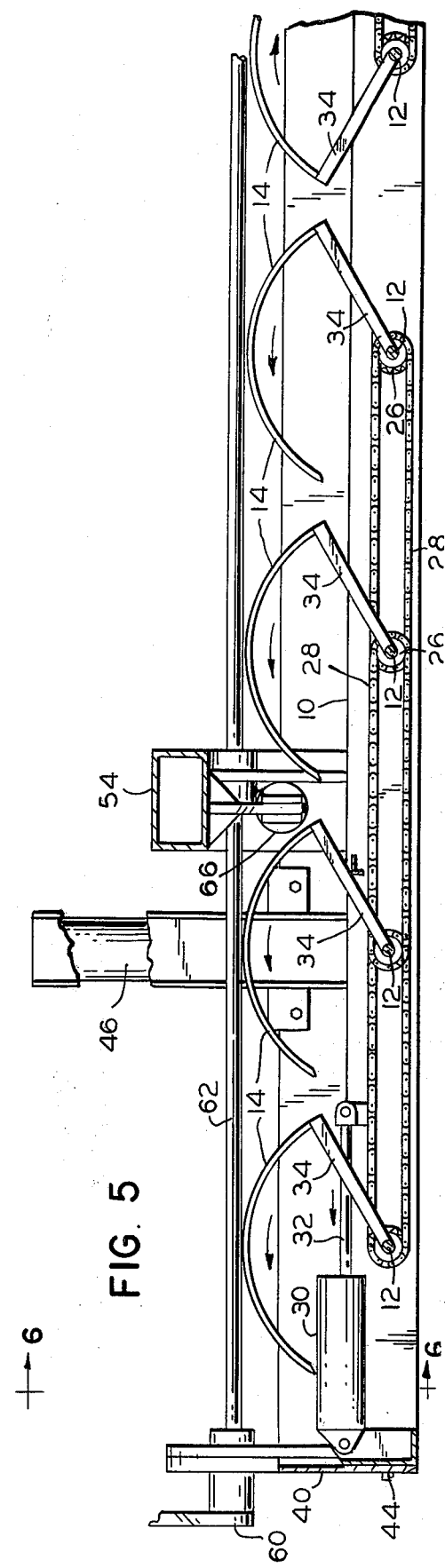

METHOD AND APPARATUS FOR REPLACING DAMAGED TURF

BACKGROUND OF THE INVENTION

Athletic fields utilized for various sports such as football, soccer, baseball and the like experience greater wear in certain portions of the field than they do in others. Natural turf may be completely worn off in certain portions of the field during the middle of the playing season, such as in the football season, and with the turf removed the playing field can become a muddy morass during a rainy period.

Accordingly, it is an object of the present invention to provide a method and apparatus for replacing portions of a playing field with a replacement section of turf of substantial size that has its entire root system substantially intact thereby permitting substantially immediate use of the replaced section.

Other objects and advantages of the invention will become more apparent hereinafter.

BRIEF DESCRIPTION OF THE INVENTION

In accordance with the present invention a device for lifting a piece of turf of substantial size, say 10 feet by 10 feet or greater, is provided and which lifting device can be used to transport the turf to a new location and set it in place therein. The device of the invention includes a rectangular frame upon which are mounted a plurality of semicircular tines. Means are provided for moving the tines from a location positioned above a section of turf on which the frame is positioned into the turf to a depth beneath the major root growing portion thereof. Means may be provided upon the frame, or other means may be utilized to sever the turf along the outlines of the frame whereupon lifting of the framework with the tines embedded within the turf section, the entire section will be elevated and can be moved with the frame to a new location. There it is set into place and the tines rotated to withdraw them from the turf whereafter the frame is removed.

DRAWINGS

FIG. 3 is a side elevation partly broken away of apparatus constructed in accordance with the invention;

FIG. 4 is an end view looking in the direction of the arrows 4—4 of FIG. 3;

FIG. 5 is an enlarged fragmentary sectional view taken substantially along line 5—5 of FIG. 4;

DETAILED DESCRIPTION OF THE INVENTION

Figure 1:
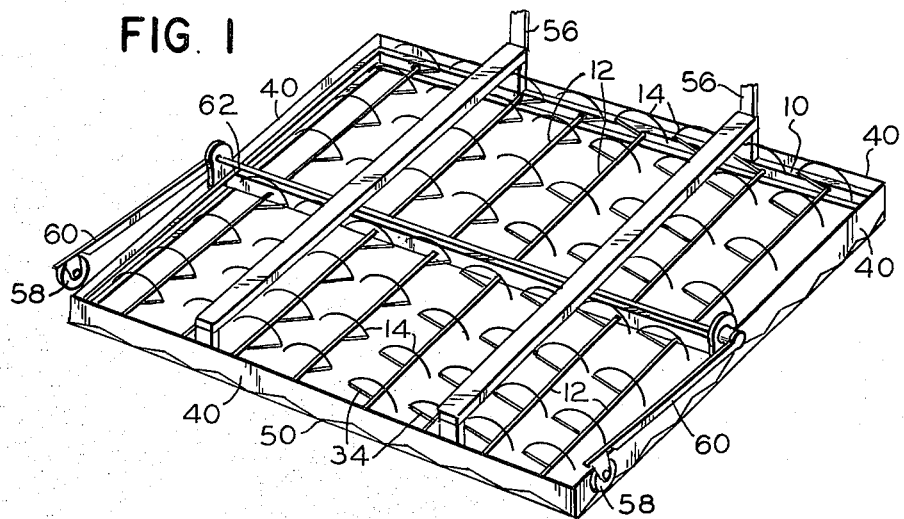
FIG. 1 is a perspective view of a turf lifting mechanism constructed in accordance with the invention showing it with the tines in their inactive position.
Figure 2:
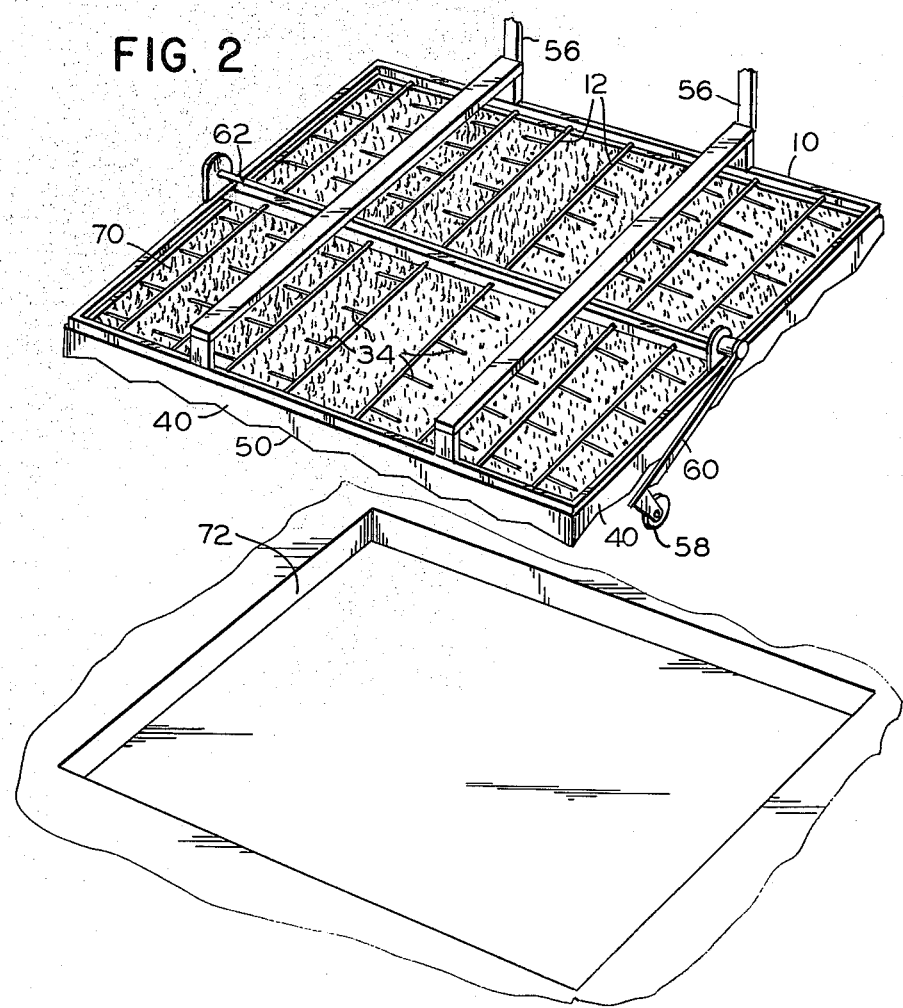
FIG. 2 is a perspective view of the turf lifting apparatus of the invention showing the same elevated above the ground with a section of turf carried thereby.
Figure 6:
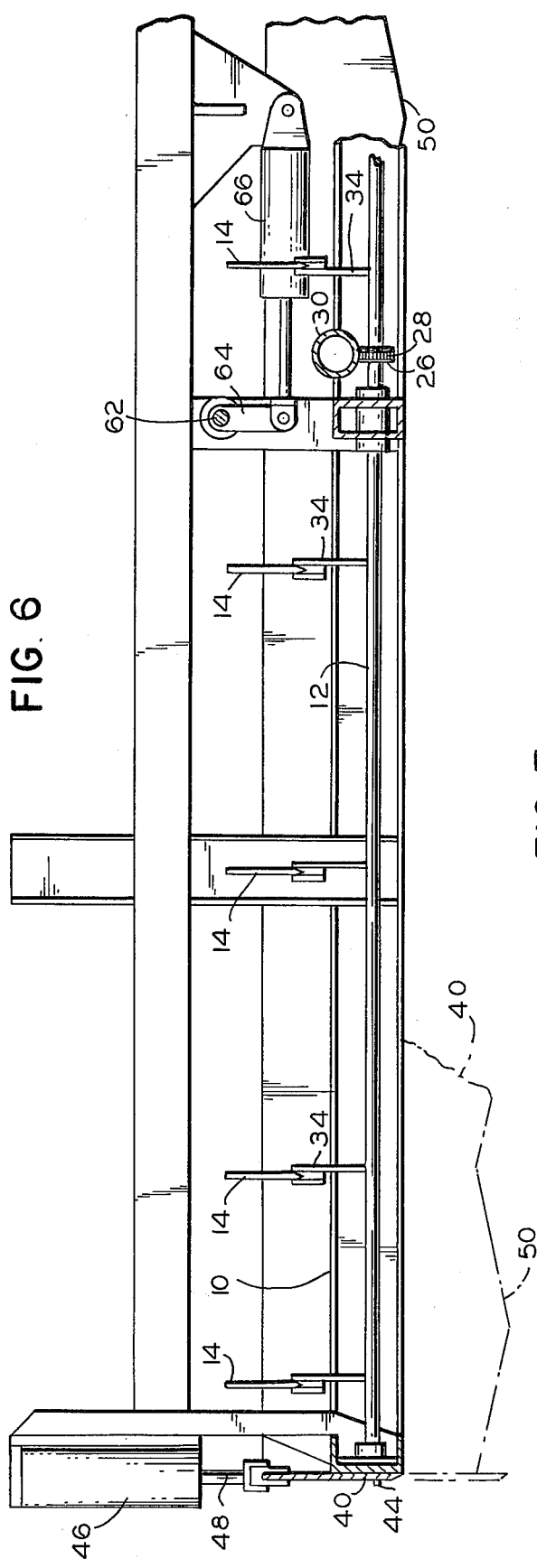
FIG. 6 is a fragmentary sectional view taken along line 6—6 of FIG. 5.

Referring now to the drawings and more particularly to FIGS. 1 and 2 thereof, the apparatus of the invention comprises a rectangular frame 10 which is preferably square and may conveniently be about 10 feet on a side. The frame carries a plurality of parallel shafts 12, each of which supports a plurality of semicircular tines 14 which have an axis of curvature coincident with the shaft upon which a tine is mounted. FIG. 1 illustrates the tines in a retracted position in which they are positioned above the turf upon which the frame 10 is positioned.

Figure 7:
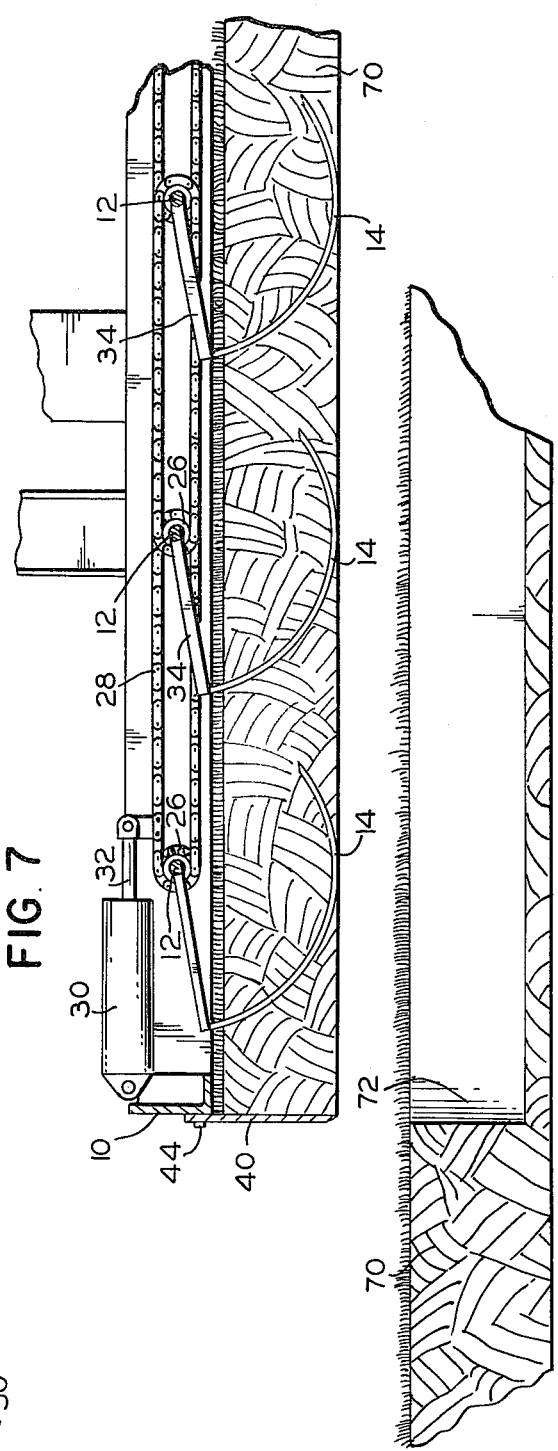
FIG. 7 is a view similar to FIG. 5 showing the tines in their turf lifting position.

Referring now more particularly to FIGS. 3 to 7, inclusive, the shafts 12 are rotatably journaled in opposite side members of the frame 10 in parallel relation. Means are provided for effecting simultaneous rotation of the shafts. Mounted on the shafts are sprockets 26 with sprockets of adjacent shafts being connected by chains 28. An hydraulic cylinder 30 is mounted on the frame 10, the piston rod 32 thereof being connected to one of the chains 28 whereby upon retraction or extension of the piston rod 32 the shafts 12 can be suitably rotated. As best appears in FIG. 5, the tines 14 are connected to the ends of arms 34 which in turn are fixedly mounted upon and radially extend from each of the shafts 12. The arms 34 preferably have a length of about 5 or 6 inches. Upon operation of the cylinder 30, the tines can be moved between a retracted position as shown in FIG. 5 to their turf section engaging position as shown in FIG. 7.

Means are also provided in the illustrated embodiment of the invention for severing a section of turf to be lifted along a periphery of the frame 10. Such means comprise a plurality of knives 40 mounted one on each side of the frame 10, each knife extending the length of the corresponding side. The knives 40 are mounted for vertical movement with respect to the frame, each of the knives having a plurality of vertical slots (FIGS. 3 and 4) therein for receiving guide pins 44 which extend from the adjacent frame side. Suitable means are provided for lowering and elevating a knife blade comprising in the illustrated embodiment hydraulic cylinders 46 mounted upon the frame 10 and having pistons connected by rods 48 to the knives 40. The bottom edges of the knives 40 may be formed with serrations 50 to facilitate penetration of the knives 40 into the turf.

Means are provided on the frame for engagement with a lifting device such as by the tines of a lift truck. In the illustrated embodiment a pair of sockets 54 are provided by channel members secured to and extending across the frame 10 for receiving the tines 56 of a lift truck (not illustrated). To help support the frame when it is loaded and elevated on the forks of a lift truck, a pair of supporting wheels 58 may be provided. In the illustrated embodiment the wheels 58 are mounted one on each of the opposite sides of the frame 10 to the ends of arms 60. The arms 60 are mounted on the opposite ends of a shaft 62 from which extends a crank arm 64 to which is connected the piston rod of an hydraulic cylinder 66 (FIG. 4). It will be apparent extension or retraction of the piston rod will effect raising or lowering of the wheels 58. Suitable conduits may be provided to each of the hydraulic cylinders 30, 46, 66 for connection of the same to the hydraulic system of a fork lift truck or other suitable source of pressure.

The operation of the apparatus of the invention will now be described. The apparatus is particularly adapted for moving a section of turf from a specially prepared plot which is formed so that it will have a parting line about 5 to 6 inches beneath the surface of the turf. This may be done by providing a growing section having a layer of sand or like friable material at a depth of 5 or 6 inches beneath the surface of the ground with a suitable grass growing medium provided thereabove. Alternatively, a perforated sheet of plastic can be positioned at such a depth and the turf growing medium placed above the plastic sheet. When the turf has reached its maturity and desired density and it is desired to move a section of the turf to a receiving plot as in a playing field, the frame 10 is positioned on the section of turf to be moved and the section of turf severed along the edge of the frame such as by insertion of the knives 40. Thereafter the knives 40 are retracted and the tines 14 inserted into the turf section as illustrated in FIG. 7. The tines 56 of the fork lift truck are then inserted into the channels 54 and the frame 10 elevated, raising with it the section 70 (FIG. 2) of turf which has been cut by the knives 40 and which is engaged by the tines 14. The wheels 58 can then be lowered to help support the relatively heavy turf section and the turf moved via the lift truck to position over an excavated receiving plot 72 (FIG. 2) which has been previously prepared to receive the turf section 70 by removing a damaged turf section in any suitable manner. The frame 10 is lowered to the ground and positioned over the excavated plot 72, withdrawing the wheels 58 as necessary to permit such lowering. When the frame is in its lowered position and the turf section is properly inserted in the excavation 72 the tines 14 can be rotated to withdraw them from the turf section 70 and the frame thereafter removed. Because the turf section 70 will have its root system substantially intact, the grass therein will maintain its growth. Because of its size, of course, the turf section 70 will resist shifting movement which might otherwise be occasioned by the forces of the playing movement upon such section and the playing field is thereby substantially restored to optimum condition.

Having illustrated and described the preferred embodiment of the invention, it will be apparent that it permits of modification in arrangement and detail.

I claim:

1. Apparatus for lifting and transporting section of sod (turf) of substantial size, comprising:
   a frame,
   a plurality of shafts rotatably carried on said frame,
   a plurality of semicircular tines mounted on said shafts (frame) for rotation about horizontal axes coincident with the axis of curvature of said tines,
   said shafts (tines) being carried on said frame in such position that upon rotation of said shafts the tines are (may be) rotated from a retracted position spaced above the surface of the sod to a sod engaging position wherein said tines penetrate the sod,
   (and) means mounted on said frame for rotating said shafts to rotate said tines between said retracted and sod engaging positions,
   knife means,
   means mounting said knife means on said frame for vertical movement between a first position beside said frame and a second position below said frame to cut the sod on which said frame is positioned,
   and means connected to said knife means for effecting movement of said knife means between said positions.

2. Apparatus as set forth in claim 1 comprising motor means operatively connected to said knife means for effecting turf cutting movement thereof.

3. Apparatus as set forth in claim (2) 1 wherein said frame is rectangular,
   means on said frame for engagement by the tines of a fork lift truck to permit lifting of the frame and the turf section carried thereby,
   a pair of wheels,
   means mounting said wheels one on each of the opposite sides of said frame for vertical movement between positions above and below the frame,
   and means for effecting movement of said wheels between said positions.

4. The method of replacing a damaged piece of turf of substantial size comprising:
   removing from a turf field a section of damaged turf of predetermined outline and to a predetermined depth below the major portion of the root system of the turf,
   severing a section of healthy turf to conform to said predetermined outline,
   positioning a rigid frame over said section of healthy turf,
   engaging said section of healthy turf at a plurality of points with lifting elements secured to said frame, said elements penetrating to a depth below the major portion of the root system of the turf,
   elevating said frame whereby said section of healthy turf is elevated with said frame, moving said frame to a position over the location of said damaged section of turf,
   placing said section of healthy turf in said location,
   disengaging said lifting elements, and removing said frame.

* * * * *